Feb. 11, 1969

L. V. JORGENSEN ET AL 3,427,101

COMPATIBLE MOTION PICTURE PROJECTOR

Filed Oct. 19, 1965

Inventors:
Lester V. Jorgensen
Melvin T. Kerstein
By Barry L. Clark
John E. Peele Jr.
Attys Feb. 11, 1969

L. V. JORGENSEN ET AL 3,427,101

COMPATIBLE MOTION PICTURE PROJECTOR

Filed Oct. 19, 1965

Inventors:
Lester V. Jorgensen
Melvin T. Kerstein

By Barry L. Clark
John E. Peele Jr.
Attys

Inventors:
Lester V. Jorgensen
Melvin T. Kerstein
By Barry L. Clark
John E. Peele Jr. Attys

United States Patent Office 3,427,101
Patented Feb. 11, 1969

3,427,101
COMPATIBLE MOTION PICTURE PROJECTOR
Lester V. Jorgensen, Skokie, and Melvin T. Kerstein, Chicago, Ill., assignors to Bell & Howell Company, Chicago, Ill., a corporation of Illinois
Filed Oct. 19, 1965, Ser. No. 498,040
U.S. Cl. 352—79     14 Claims
Int. Cl. G03b 41/00

This invention relates to a motion picture projector which is compatible for use with a plurality of films having a constant width but varying perforation locations and pitches and different sized image areas. The embodiment of the invention described herein has particular utility in that it permits the projection of both standard and super 8 millimeter films.

In order to utilize more of the area of an 8 mm. film for the image, the super 8 format has been developed. However, in order to increase the image area, changes have been made in the location, spacing and size of the film perforations. These changes are of such magnitude that equipment designed for use with the standard 8 format cannot be used with the super 8 format. Since many persons already own a considerable number of reels of standard 8 films, it is desirable that a projector be developed which will work equally well with either type of film.

In the past, several projectors have been proposed to handle different film sizes and different format sizes. Those designed for multiple film sizes, such as are shown in the U.S. Patent No. 2,061,879, generally were provided with a shuttle mechanism to handle each film. As the shuttle mechanism was manually selected, the operator at the same time was required to change the aperture plate for the appropriate film format. Thus, it is readily seen that the changeover between films required a considerable delay and several manual operations. Further, failure to properly select coordinated components could damage the film or at least make the projected pictures unacceptable.

Accordingly, one object of this invention is to provide a projector which will transport and project a plurality of films having different image formats and different locations and pitches for the perforations.

Another object is to provide a projector which can be quickly switched from one mode of operation to another.

Yet another object is to provide mechanism for shifting the location of the shuttle teeth and aperture plate relative to the film.

A further object is to provide a shuttle member which has a pair of teeth spaced at such a distance as to permit engagement of a common pair of nonadjacent perforations in films having different pitches.

A still further object is to provide a projector having a mechanism to vary the stroke of the shuttle to permit the shuttle to drive films having different perforation pitches.

Another object of the present invention is to provide in a motion picture projection apparatus a modifiable film gate arrangement wherein the alignment of the center lines of frames of a plurality of films which are normally nonaligned are brought into coincidence with the projection axis of the projector.

Yet another object of the present invention is to provide in a motion picture projector a modifiable film gate arrangement wherein the alignment of the perforations of a plurality of films which are normally nonaligned are brought into coincidence with the predetermined position of a pair of teeth of the projector shuttle mechanism.

Another object is to provide a single control linkage for shifting a projector from operation with one film format to operation with another.

A still further object is to provide a safety interlock for preventing shifting of the control linkage when the film handling mechanisms are in a position where they are capable of engaging film.

The preferred embodiment of the invention is shown in the accompanying drawings wherein.

In accordance with the principles of the invention, the projector is adapted to handle a plurality of film types, each having different perforation pitches, different frame center lines, and different alignment of perforations relative to the longitudinal edge of the film. To attain a projector compatible to the several film types in all these aspects, several novel features are herein related.

One novel feature of the invention resides in the shuttle mechanism which is provided with a pair of particularly spaced shuttle teeth. The particular tooth arrangement permits movement through the projector of a plurality of films having different perforation pitches. The shuttle mechanism also includes means to properly frame each film type in alignment with the aperture. To attain the proper amount of film movement for a particular format, the shuttle mechanism is provided with a means to change the amplitude of movement of the shuttle teeth.

A second novel feature of the invention resides in the aperture mask member which defines a plurality of format sized apertures selectively positionable in the film gate. An additional feature is the provision of means for causing relative lateral movement of the film and the shuttle teeth of the shuttle mechanism to provide for alignment of the perforations of the film with the shuttle teeth. This feature, in combination with a shifting of the mask member provides for alignment of the film frame center lines for a plurality of apertures. In the disclosed embodiment of the invention, movement of the shuttle and aperture mask are coordinated for each film type and controlled by an actuator. Since movement of either the shuttle or the mask during projection could damage a film, a safety device is provided for preventing operation of the actuator when the film gate is closed.

Now referring particularly to the drawings, an embodiment of the invention will be described as applied to a motion picture projection apparatus capable of handling a plurality of films having different formats and different pitches.

Figure 1:
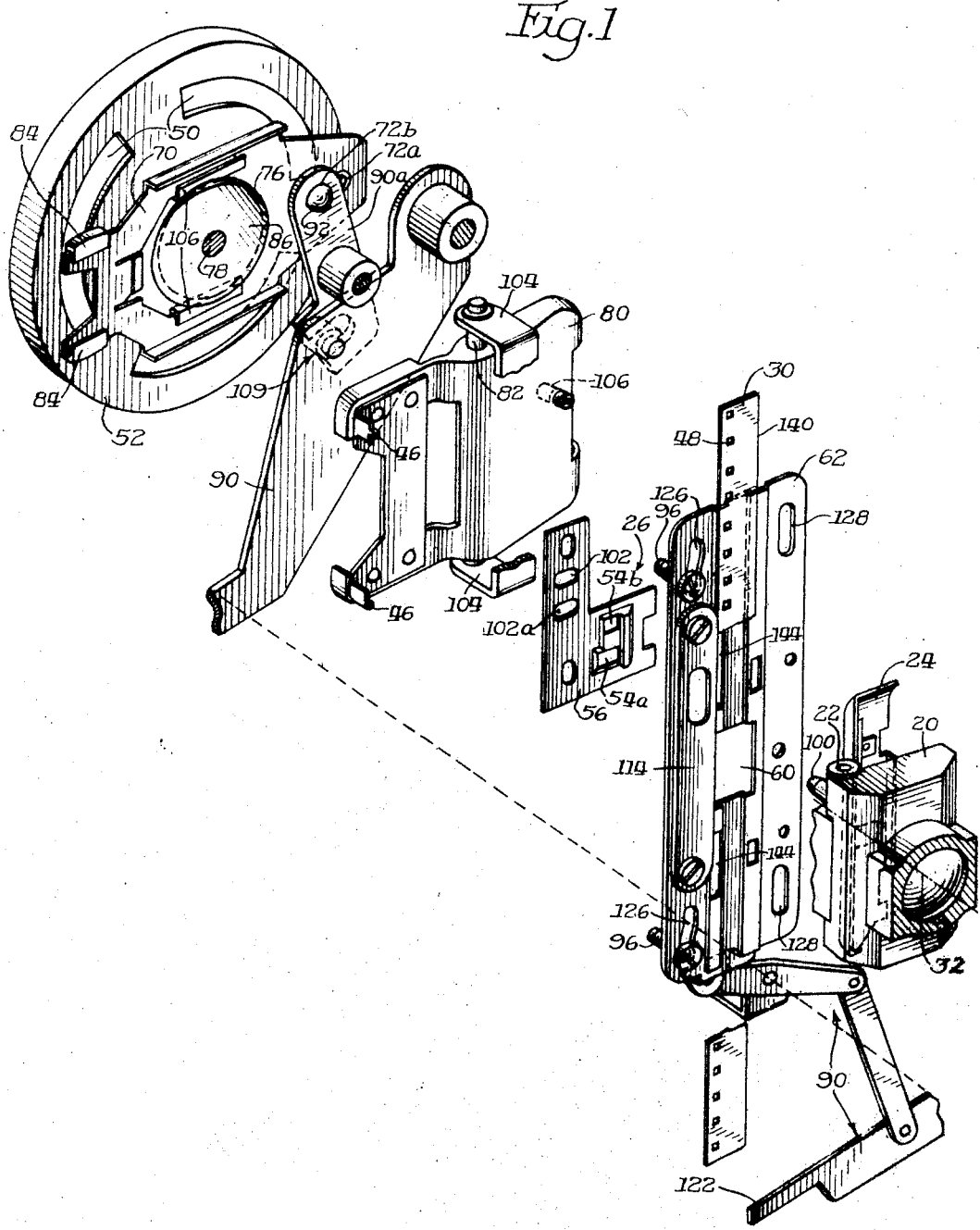
FIG. 1 is an exploded view of the shuttle mechanism and the area defining the film gate of the projector.
Figure 2:
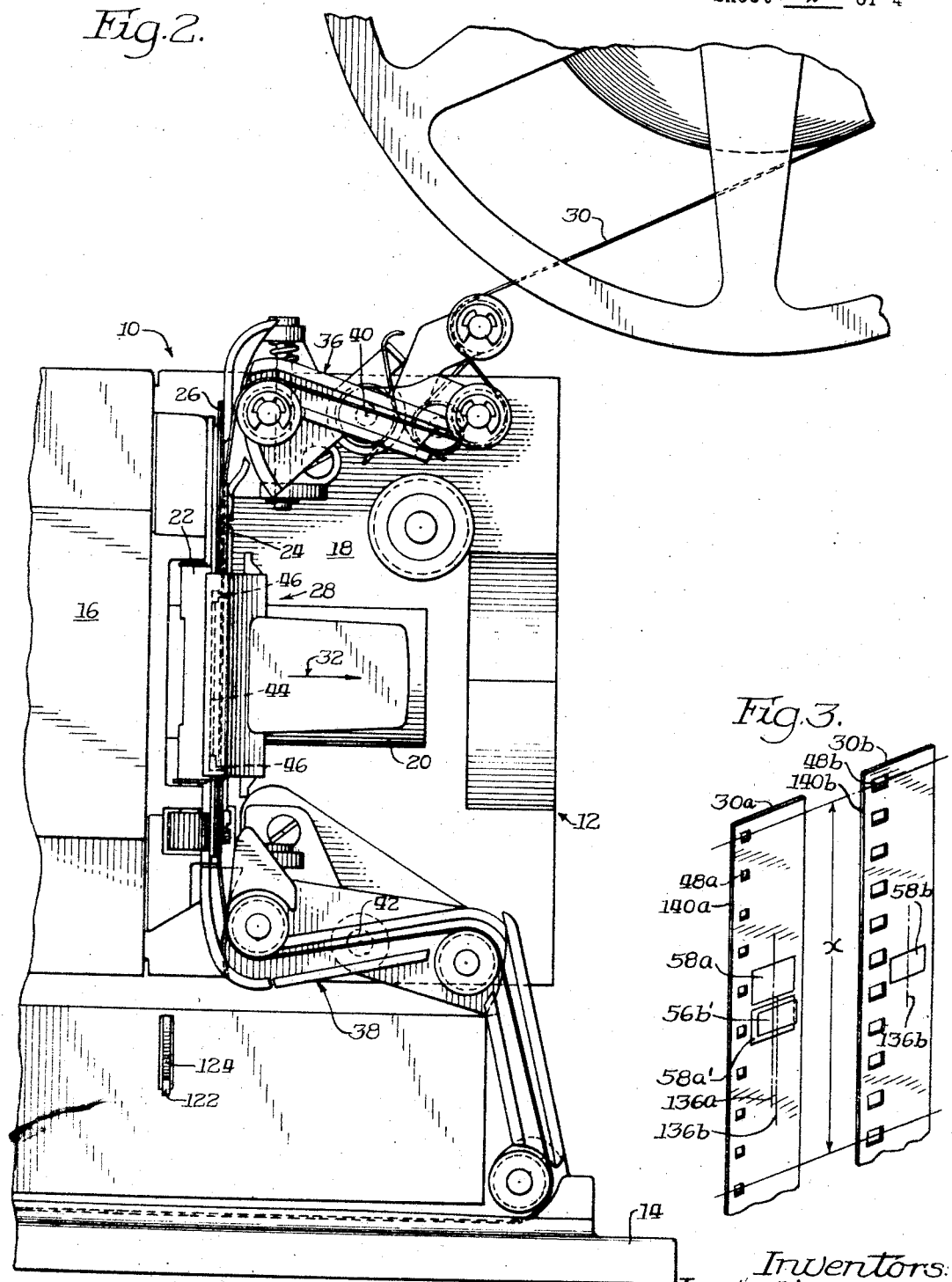
FIG. 2 is a side elevation of a sprocketless projector in which the invention is incorporated showing the film guiding and snubbing means in its operative position.

With reference to FIG. 2, a moving picture projector 10 with a housing, identified generally as 12, is mounted on a base plate 14 and includes a lamp housing 16 alongside of which a support plate 18 is mounted. A lens housing 20 is pivotally mounted to the lamp housing by means of a hinge pin assembly 22. A pressure plate 24 and an aperture plate assembly 26 (better seen in FIGS. 1 and 5–8) are mounted between the lens housing 20 and lamp housing 16 where they define a film gate 28. Through this film gate, a film 30 is moved for projection of the image thereon along an optical axis 32. The optical axis 32 is defined by a lens (not shown) in lens housing 20. The lens housing is adapted to be swung away from its position shown in FIG. 2 to permit access to the lens, pressure plate, and aperture plate.

The film 30, to be projected, is moved from a film supply station, such as a reel 34, along a film path defined by an upper threading and film feeding assembly 36 to and through the film gate 28 generally aligned with the optical axis 32. It is then transported to a lower feeding assembly 38 on the other side of optical axis 32, and to a takeup station (not shown). Components of the film feeding assemblies, for example, the various guiding and snubbing rollers, are shown in FIG. 1 but are not described since they form no part of the present invention. The assemblies 36, 38 are respectively mounted for rocking movement about axes 40, 42 and are so designed as to permit the film 30 to be fed through the projector and intermittently stopped for projection of its individual frames without the use of sprocket wheels and loop formers. Intermittent movement of film through the film gate 28 is provided by a shuttle mechanism 44 having spaced shuttle teeth 46. The mechanism is operated so that the teeth move in a box-like pattern to intermittently engage the perforations 48 (see FIGS. 1 and 3) of film 30 in a known manner. When the film is not being transported by the shuttle mechanism 44, it is held stationary in the film gate 28 by friction between the pressure plate 24 and the aperture plate assembly 26. While the film is stationary, a light beam from lamp housing 16 is permitted to pass along optical axis 32 by openings 50 in a rotating shutter 52. The beam, beside passing through the frame of film aligned with the optical axis, passes through one of a plurality of format sized apertures 54a, 54b in a mask member 56 which forms a component of the aperture plate assembly 26 (see FIG. 1). These apertures 54 are of slightly smaller dimensions than the image frames 58 of each type of film to be projected. The aperture portions of mask member 56 are adjustably positioned in an oversized opening 60 in the aperture plate 62 of the assembly 26. Although the format sized apertures 54 have been shown on the aperture plate, it is to be understood that they could also be associated with the pressure plate.

Even though elimination of drive sprockets reduces the problems inherent in designing a compatible projector, many other changes must be made. Such changes include the movement of the aperture to a position where it will match the format of the film frame to be projected. Further, since the film types usable in the projector have different perforation pitches, the throw of the shuttle must be coordinated to move the required length of film so as to align each frame in the format sized aperture. One feature of the present invention is the provision of structure for accomplishing the changes simultaneously.

Figure 3:
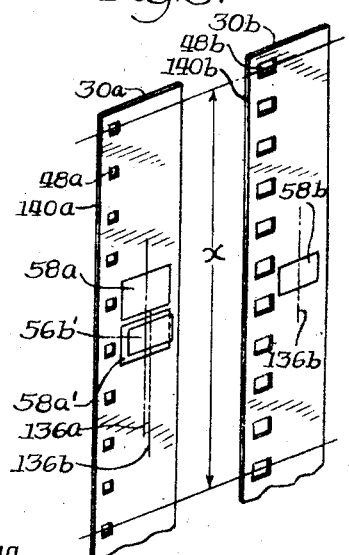
FIG. 3 shows a length of super 8 film and a length of standard 8 film and the relative orientations of the image frames, the perforations, and the center frame lines of the films.

Referring now to FIG. 3, a pair of similar width films 30a, 30b, described as "super film" and "standard film," respectively, are shown. Each film has a different format as can be readily seen from a comparison of the height and width dimensions of the image frames 58a, 58b (also seen as superimposed 58a', 58b' on film 30a); and a different pitch as is seen by comparing the spacing between adjacent perforations or sprocket holes 48a, 48b in a length X of the films. Length X is the closest spacing of a nonadjacent, nonmultiple, whole number of perforations common to two film types usable in the projector. In the case of the standard and super 8 formats, X is 1.5 inches.

By spacing a pair of shuttle teeth 46 from each other by the distance X, it is possible to engage a plurality of films having perforation pitches which are not multiples of each other. It would, of course, be possible to provide only one shuttle tooth but this is undesirable since the film would stop and burn every time a torn perforation was encountered. Accordingly, it is standard practice to provide a "safety" tooth which will drive the film when the main tooth encounters a torn perforation. Although "safety" teeth are commonly adjacent the main tooth, in the present invention, the main tooth and safety tooth are spaced apart by the distance X defined supra.

Even though the shuttle teeth 46 are spaced so as to transport either of two film formats, it is also necessary to vary their stroke length. The stroke length changes are due to the greater pitch distance of perforations 48a as compared to 48b. In FIG. 3, it can be seen that super 8 film 30a has only nine perforations in the distance X while standard 8 film 30b has ten perforations.

The mechanism for changing the stroke length will be described in detail in connection with FIGS. 4 and 5. In general, however, the mechanism includes:

A shuttle drive member 70, whose pivot point can be changed from 72a to 72b depending on whether a long stroke is desired for super 8 or a short stroke for standard 8;

A cam 74 for rocking the shuttle drive member 70 about its pivot point by means of an up and down peripheral cam surface 76 thereon;

A drive shaft 78 for rotating cam 74;

A shuttle member 80 vertically reciprocated on rod 82 by pads 84 on member 70 when cam surface 76 rocks that member;

An actuator linkage 90 for moving a pivot member or sphere 92 into either of the pivot points or detents 72a, 72b; and A face or in-and-out cam surface 86 on cam 74, for causing the shuttle member 80 to pivot about rod 82 and move the shuttle teeth 46 in and out of perforations 48 of film 30.

The several film formats to be used in the projector not only differ in the location of their perforations but also vary in frame size and location (see FIG. 3). Therefore, in addition to changes in the shuttle drive, it is also necessary to change the aperture mask and its location relative to the film when switching from one format to another.

Although the aperture changing mechanism will be hereinafter described in detail (FIGS. 6–8), it can be described briefly in connection with FIG. 1. In this view, one can see that the aperture plate assembly 26, including aperture plate 62 and mask plate 56, is movable vertically and slightly sideways on guide pins 96 fixed to the projector housing. This movement is necessary in order to shift one or the other of aperture masks 54a and 54b on plate 62 into alignment with the optical axis 32. The aperture plate assembly 26 is shifted by actuator linkage 90 at the same time the shuttle mechanism 44 is moved. To prevent possible damage to the film which might be caused by an attempt to operate the actuator linkage 90 when a film is in the projector, a combined safety and alignment pin 100 is provided on the pivotable lens gate 20. This pin 100, effectively an interlock, is adapted to engage one of the holes 102a, 102b in aperture mask 56 as lens gate 20 is closed. This engagement will cause a final alignment of mask 56 and overcome any inaccuracies in the movement of aperture plate assembly 26 on guide pins 96. The engagement of interlock pin 100 with the aperture mask plate when lens gate 20 is closed also locks the assembly 26 and actuating linkage 90 against movement.

Figure 4:
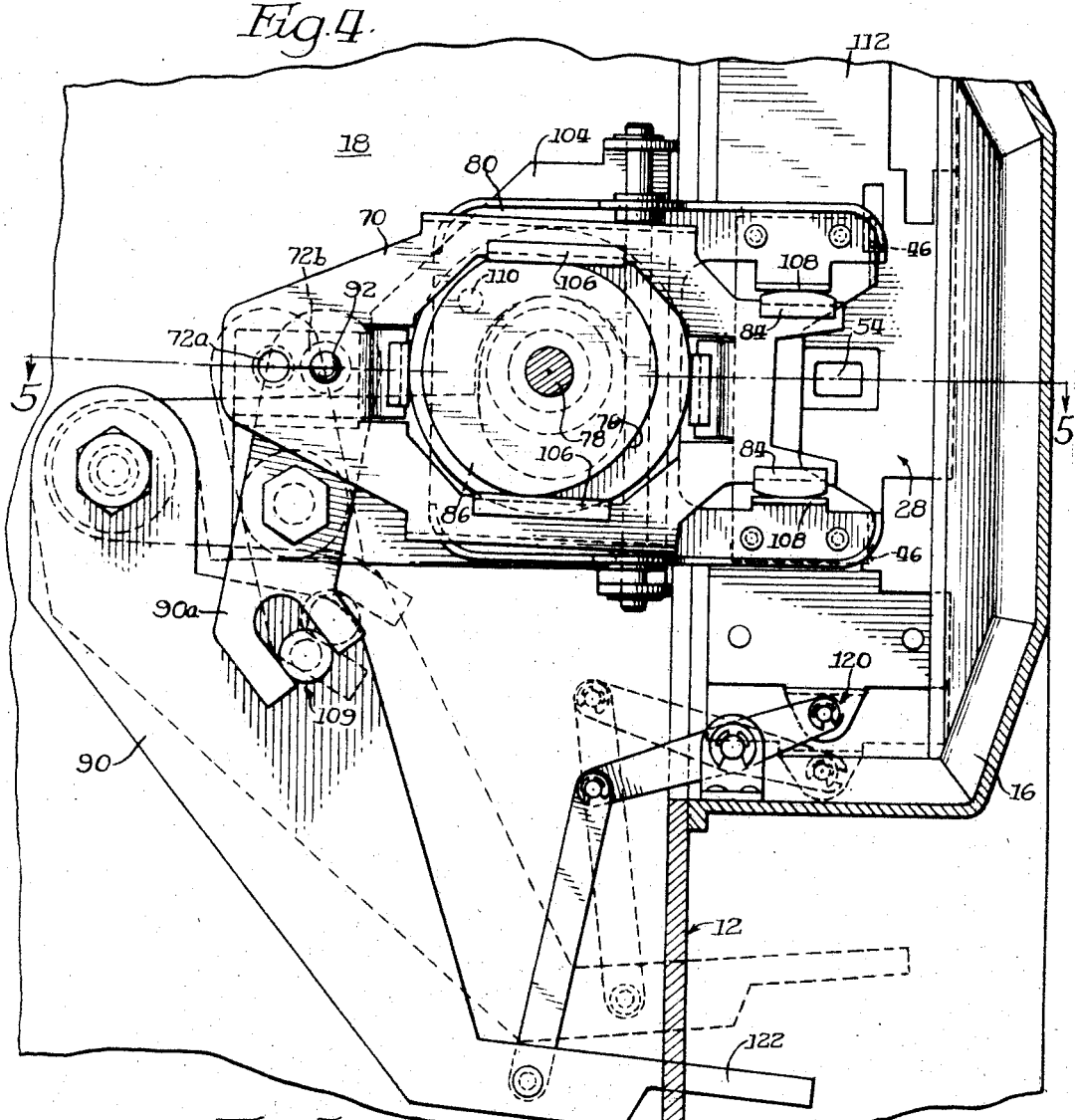
FIG. 4 is a sectional, elevational view of the shuttle mechanism as seen from the interior of the projector.
Figure 5:
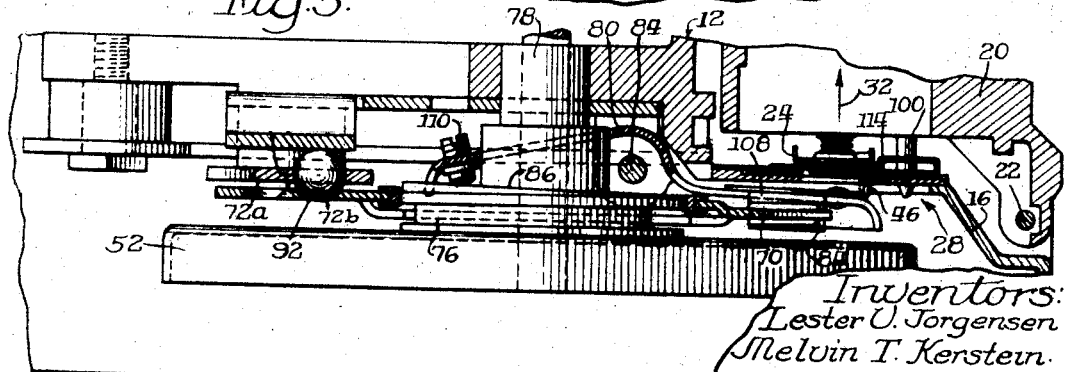
FIG. 5 is a sectional view taken along line 5—5 in FIG. 4.

To more particularly describe FIGS. 4 and 5, the shuttle member 80 is seen to be reciprocated on rod 82, which is mounted in a bracket plate 104 so as to be substantially parallel with the path of film 30 through film gate 28. The reciprocation is transmitted to shuttle member or plate 80 from the constantly rotated up-and-down cam surface 76 by the shuttle drive member or plate 70 which has shoes 106 that engage cam surface 76. The eccentricity of cam surface 76 rocks the shuttle drive member 70 about pivot points or centers 72a, 72b causing the pair of pads 84 to engage flats 108 on the shuttle member 80 near the teeth 46, and to longitudinally move that member along rod 82. The length of the throw or longitudinal movement of the shuttle member 80 is determined by the length of the effective lever arm between the pivot points 72a, 72b, and an axis through shaft 78 with which the points are aligned. This length is determined when the pivot member 92 is positioned by actuator linkage 90 through a shiftable pivot carrier link 90a connected to the actuator linkage at 109. The longer lever arm, as when the pivot member 92 is in pivot point 72a, causes shuttle member 80 to move a shorter distance than does the shorter lever arm when the pivot member is in the pivot point 72b, closer to the axis. The comparative throw lengths for standard 8 and super 8 films are, respectively, .1500 and .1667 inch. With each throw of the shuttle member 80 and the teeth 46 thereon, the in-and-out cam 86, by engagement through a cam follower 110, adjustably positioned in the member 80, causes the member to rock about the rod 82, which defines an elongated pivot axis. The two cams are powered together by shaft 78 to cause the shuttle mechanism 44 to cyclically move the film frames into proper alignment in the projection axis 32, where each frame is intermittently held between the aperture plate assembly 26 and the pressure plate 24 for projection as one or more of the openings 50 of shutter 52, also on shaft 78, permit light to pass along the axis.

Figure 6:
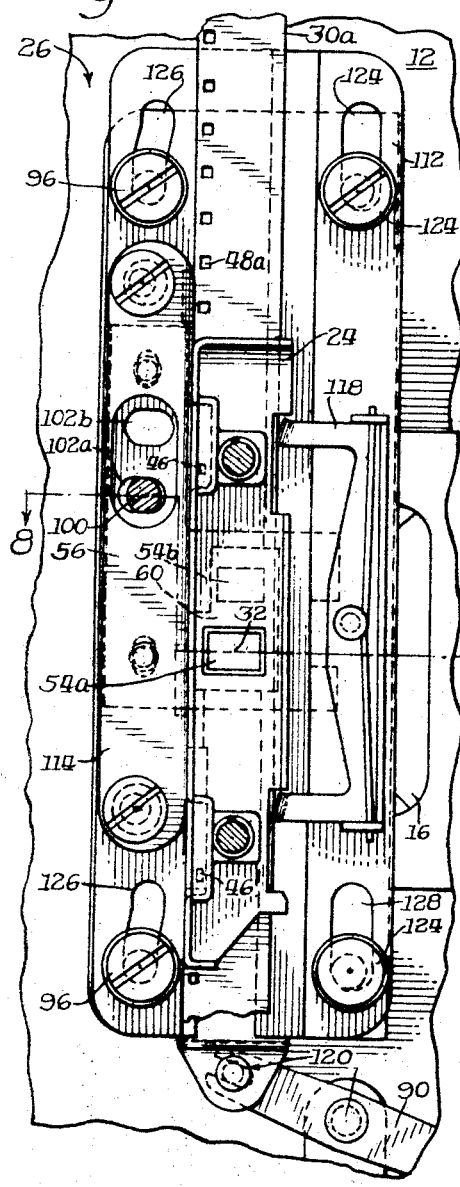
FIG. 6 is a sectional elevational view of the film gate area of the projector showing a strip of super 8 film in the gate with the aperture plate assembly adjusted for that film format.
Figure 7:
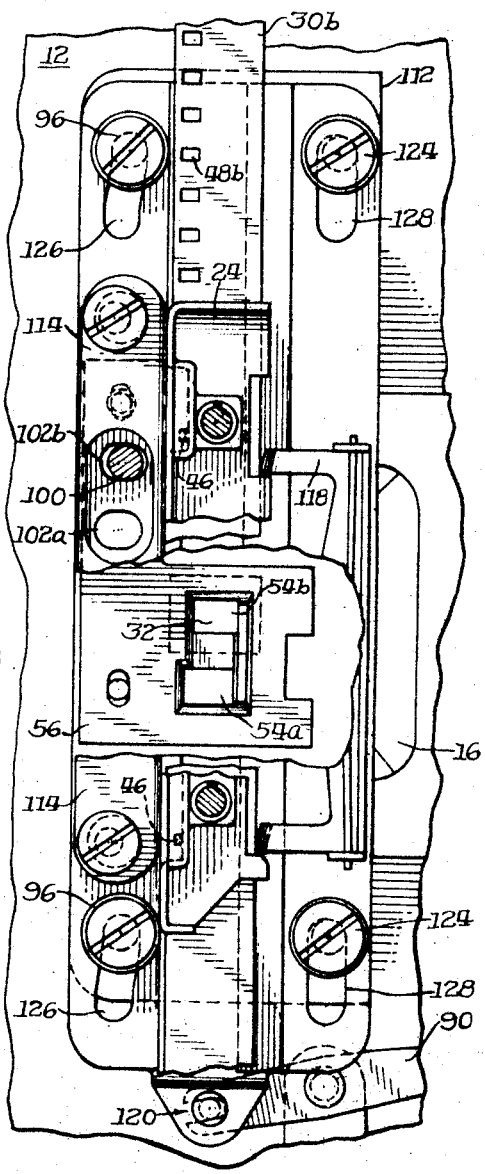
FIG. 7 is a view similar to FIG. 6 showing a strip of standard film in the film gate and the aperture plate assembly adjusted for that format.
Figure 8:
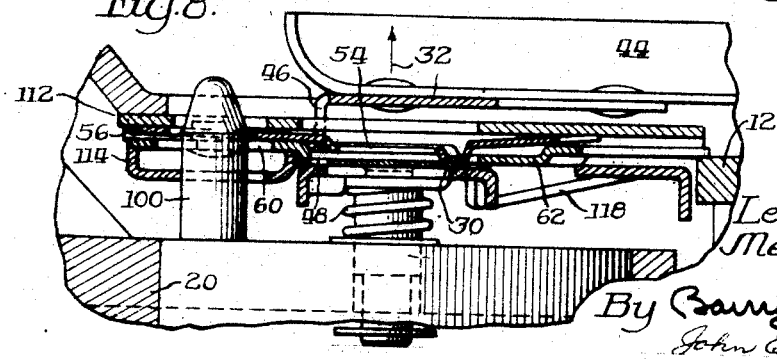
FIG. 8 is a sectional view taken along line 8—8 in FIG. 6.

In FIGS. 6, 7, and 8, the projector film gate area 28 is shown with the aperture plate assembly 26 mounted on a backing plate 112 which is part of the projector housing 12. The aperture plate assembly 26 comprises the mask member 56 and the aperture plate 62 on which a fixed side guide 114 and a movable side guide 118 are mounted adjacent the large opening 60 through which the optical axis 32 passes. The mask member 56 is movably attached to the aperture plate between it and the backing plate 112. The aperture plate, side guides, and mask member, which is connected to the plate through a coupling 120 are moved vertically by the actuator linkage 90. This permits shifting of the super 8 aperture 54a (as in FIG. 6) or the standard 8 aperture 54b (as in FIG. 7) in the mask member into alignment with the projection axis. Shifting of the actuator linkage 90 between its two positions, as seen in solid and broken lines in FIG. 4, is accomplished by the operator who moves the linkage handle 122, which extends through a slot 124 in the housing 12. (See FIG. 2.) This shifting causes aperture plate 62 to move vertically relative to the pair of fixed guide pins 96, and a pair of riding pins 124 which extend respectively through a pair of guide slots 126 and a pair of riding slots 128 in the plate 62. Guide slots 126 are shaped with the centers of their longitudinally spaced ends offset relative to one another. The widths of the slots are accurately dimensioned to the diameter of the guide pins 96 so that the plate is caused to move sideways when it is vertically moved from one offset end of the slot to the other. The riding slots 128 are slightly wider than the diameter of the riding pins 124 to permit the sideways shift of the plate. The amount of sideways shift desired for use of standard 8 and super 8 films is .008 inch.

The vertical shift of the aperture plate 62 moves the mask member 56 so that one of the smaller apertures 54a, 54b is aligned with projection axis 32. Because of the differences in the size of the formats of the different films, it is desired to mask the frames of the respective films to definite sizes rather than to use a single mask. The mask member 56 is mounted on aperture plate 62 for limited vertical movement relative thereto when the plate is shifted between positions. This minor adjustment is to compensate for inaccuracies in the plate which may occur in manufacture or by subsequent wear due to use.

To accomplish the alignment, the aligning or safety pin 100 is positioned on the lens housing 20 to pass through the aperture plate and into one of the pair of slots 102a, 102b in the mask member. As the lens housing 20 is closed and the rounded head of the aligning pin 100 moves into the slot generally aligned with it, the mask member may be slightly shifted either up or down. It is understood that although the mask member is described as movable relative to the aperture plate, it and the plate may be fixed together, and the whole assembly moved.

The sideways shift of aperture plate 62 is required because the longitudinal center lines 136a, 136b of the respective film frames 58a and 58b, and the perforations 48a, 48b of the different film types are spaced at different distances from that longitudinal edge 140a, 140b of each film along which the perforations extend (see FIG. 1). The shift causes the smaller apertures 54 in mask member 56, and side guides 114, 118 to move for proper spacing relative to the longitudinal edges.

When the plate is moved sideways by guide pins 96, the side guides 114, 118 fixed thereto are caused to shift relative to the shuttle teeth 46 which extend through slots 144, 144 in the plate where they engage the film in the film gate 28. This slight shifting of the side guides positions the perforation of the films so that the teeth enter them substantially through the center preventing the undesirable noise of "side-slap" caused when the teeth first engage the film adjacent the perforations 48 before moving into the perforations. Both relative movements are desirable for substantially perfect alignment of the perforations with shuttle teeth 46, and similar alignment of the center lines with the optical axis.

At the same time that the perforations are caused to shift, the frame center line is shifted so that it is aligned through a longitudinal center line of the smaller apertures 54a, 54b in mask member 56. Since the aperture line has been shifted into alignment with the axis 32, the highest quantity of light available along the axis is passed through the film frame onto the remote surface.

While the invention has been particularly shown and described with reference to preferred embodiments thereof, it will be understood by those skilled in the art that various changes in the form and details may be made therein without departing from the spirit and scope of the invention.

We claim:
1. In a motion picture projector apparatus of the type in which a plurality of film types, each having different perforation pitches, may be moved from a film supply station through a film gate, the apparatus comprising:
 a shuttle mechanism located at said film gate;
 first and second teeth on said shuttle mechanism, said first and second teeth being spaced apart by a distance equal to the spacing between a pair of non-adjacent perforations on said film, said distance being equal to the space between:
  a whole number of perforations on a first one of said film types; and
  a different whole number of perforations on a second one of said film types, and wherein the whole number of perforations on said first film type is not a multiple of the whole number of perforations on said second film type.
2. The apparatus of claim 1 wherein said distance by which said teeth are spaced apart is 1.5 inches.
3. The apparatus of claim 1 wherein said first whole number is 9 and said different whole number is 10.
4. The apparatus of claim 1 including
 cam means to cyclically drive said shuttle teeth up and down parallel with the path of movement of film through said film gate; and
 a plurality of pivot points on said shuttle mechanism remote from said shuttle teeth and said cam means, and coacting with a positionable pivot to adjust the distance of movement through which said shuttle teeth and therefore the film, will be moved.

5. The apparatus of claim 4 wherein the distance of movement of said teeth when said pivot coacts with said first pivot point is .1667 inch and said distance is .1500 inch when said pivot coacts with said second pivot point.

6. The apparatus of claim 4 including a film path through said film gate, and wherein said shuttle mechanism comprises a shuttle plate on which said teeth are supported, said plate being adapted to be rocked about an axis parallel with said film path; and a shuttle drive plate in operative engagement with said shuttle plate and said cam means to reciprocate said shuttle plate along said axis in response to said cam means.

7. The apparatus of claim 6 wherein said pivot points are on said shuttle drive plate to selectively coact with said pivot so as to determine the distance of movement of said shuttle teeth; and actuator linkage means on said projector to cause shifting of said pivot to coact with a selected one of said pivot points whereby a shuttle tooth distance of movement is selected.

8. The apparatus of claim 1 including a movably supported film side guide at said film gate adapted to engage a longitudinal edge of each of said film types in which the perforations are at different spacing from said edge said side guide being movable substantially transversely between positions parallel with an imaginary line through the teeth of said shuttle means when said projector is changed from operation with one film type to operation with another.

9. In a motion picture projector for projecting each of a plurality of film types, the frames of each type having a different format and a different longitudinal center line relative to the longitudinal edge of said film along which a plurality of perforations are longitudinally spaced, said projector including:

a projection station defining a projection axis at a film gate, and an aperture assembly at the film gate comprising:

an aperture plate having an opening therein through which said projection axis passes;

aperture mask means having a plurality of format sized apertures corresponding to the formats of said films, each of which is selectively positionable in said opening in alignment with said projection axis;

said format sized apertures having longitudinal center lines relatively offset with respect to one another; and means for longitudinally and transversely shifting of said aperture plate and said mask means upon changing said projector from operation with one film to operation with another;

wherein the longitudinal center line of one of said format sized apertures to be projected is aligned with said projection axis.

10. The projector of claim 9 wherein the transverse shift of the center lines of said format sized apertures is .008 inch.

11. In a motion picture projection apparatus for projecting each of a plurality of film types, each type having a different format and a different perforation pitch, the perforations of said films being aligned along one longitudinal edge of said films at different transverse locations relative to said edge, said films being movable through a projection station defined by an optical axis, and an aperture plate assembly at said projection station, the assembly comprising:

mask means at said projection station defining format sized apertures corresponding to the formats of said films;

said mask means being longitudinally and transversely movable so that a longitudinal center line of said format sized apertures is alignable with said optical axis;

a shiftable film side guide adjacent said mask means for positioning of film relative said apertures and said optical axis; and means to shift simultaneously said mask means and said side guide when shifting said projector from operation with one film to operation with another;

whereby said perforations of said films are aligned with said shuttle teeth by said side guide and said mask means is positioned to align the center line of one of said format sized aperture with said optical axis.

12. In a film projection apparatus in which a plurality of film types each having different perforation pitches and different formats, may be moved from a film supply station through a projection axis defining a projection station, the invention comprising:

a constantly rotated drive shaft;

a shuttle mechanism for transporting film from said supply station through said projection station including:

means engaging said drive shaft to cyclically drive said shuttle mechanism;

a shuttle tooth on said shuttle mechanism to be cyclically moved with a longitudinal throw substantially parallel with the path of movement of film through said projection station; and means shiftable between a plurality of positions for adjusting the operation of said shuttle mechanism to select the length of longitudinal throw of said shuttle tooth; and mask means at said projection station defining a plurality of format sized apertures, including:

means causing relative movement between said mask means and said projection axis to selectively align said format sized apertures with said projection axis; and means operatively connected to said last named means and to said shuttle tooth throw selecting means to align one of said format sized apertures with said projection axis, and simultaneously to adjust the length of throw of said shuttle tooth when shifting said projector from operation with one film type to operation with another film type.

13. In a motion picture projector of the type in which a plurality of films, each having different perforation pitches and different formats, may be moved from a film supply through a film gate, the improvement comprising:

a shuttle mechanism at said film gate including at least one pair of longitudinally spaced teeth;

means for mounting said pair of teeth on said shuttle mechanism for engagement with nonadjacent perforations on either of said films, said pair of teeth being spaced apart a distance equal to a whole number of perforations in a first one of said films and a different whole number of perforations in a second of said films wherein said whole number of perforations on said first film is not a multiple of the whole number of perforations of said second film;

said shuttle mechanism including a pivotably supported shuttle drive member operatively connected to move said teeth in a longitudinal path parallel to the path of movement of film through said film gate;

cam means to cyclically drive said shuttle drive member about a pivot;

a plurality of pivot centers with which said shuttle drive member is adapted to be selectively engaged wherein the length of longitudinal movement of said shuttle teeth is determined by the selection of the pivot center with which said shuttle drive member is engaged;

An aperture plate as said film gate having an opening therethrough aligned with a projection axis;

mask means in said opening for reducing the size of said opening to a plurality of format sized openings corresponding to the formats of said films; and means operably connected with said shuttle mechanism and said aperture plate to simultaneously shift said shuttle mechanism between said plurality of pivot centers and to align one of said format sized openings with said projection axis upon shifting said projector from operation with one film type to operation with another film type.

14. In a motion picture projector apparatus for projection of at least two different format film types and having a projection station including a projection aperture and a pair of housing portions defining a film gate through which a film passes, one of said housing portions being fixed, the other of said housing portions being movable relative to said fixed housing portion between open and closed positions; the apparatus comprising:

an aperture mask assembly having at least two format sized apertures and being supported on one of said housing portions for movement between a first position aligning one format sized aperture with said projection aperture for projection of a first format film and another format sized aperture with said projecture aperture for projection of a second format film;

a manually operable actuator connected to said mask assembly to shift said apertures between said positions; and a blocker cooperating with one of said housing portions and said mask assembly to enable shifting of said assembly by said actuator when said movable housing is in its open position.

References Cited

UNITED STATES PATENTS

| | | | |
|---|---|---|---|
| 1,846,049 | 2/1932 | Dina | 352—79 |
| 2,007,018 | 7/1935 | La Porte | 352—80 |
| 2,153,142 | 4/1939 | Fairbanks | 352—194 |
| 2,186,443 | 1/1940 | Becker et al. | 352—80 |
| 2,834,249 | 5/1958 | May | 352—194 X |
| 3,025,753 | 3/1962 | Rodgers et al. | 352—180 |
| 3,152,741 | 10/1964 | Jorgensen | 352—194 X |
| 3,228,743 | 1/1966 | McClellan et al. | 352—221 X |

JULIA E. COINER, *Primary Examiner.*

U.S. Cl. X.R.

352—194